United States Patent
Pan et al.

[11] Patent Number: 5,867,617
[45] Date of Patent: Feb. 2, 1999

[54] HIGH-RELIABILITY MXN FIBER OPTIC SWITCHES

[75] Inventors: Jing-Jong Pan, Milpitas; Yonglin Huang, San Jose, both of Calif.

[73] Assignee: E-Tek Dynamics, Inc., San Jose, Calif.

[21] Appl. No.: 901,537

[22] Filed: Jul. 28, 1997

Related U.S. Application Data

[60] Provisional application No. 60/047,025 May 19, 1997.

[51] Int. Cl.$^6$ ...................................................... G02B 6/36
[52] U.S. Cl. ................... 385/18; 385/16; 385/17; 385/36; 385/47
[58] Field of Search ................................. 385/18, 16–24, 385/33, 36, 46, 47

[56] References Cited

U.S. PATENT DOCUMENTS

| | | | |
|---|---|---|---|
| 4,239,332 | 12/1980 | Inbar | 350/96.2 |
| 4,378,144 | 3/1983 | Duck et al. | 350/96.18 |
| 4,611,885 | 9/1986 | Boirat | 350/96.2 |
| 4,641,915 | 2/1987 | Asakawa et al. | 350/96.18 |
| 5,359,683 | 10/1994 | Pan | 385/22 |
| 5,420,946 | 5/1995 | Tsai | 385/22 |
| 5,436,986 | 7/1995 | Tsai | 385/16 |
| 5,444,801 | 8/1995 | Laughlin | 385/16 |

*Primary Examiner*—Phan T. H. Palmer
*Attorney, Agent, or Firm*—Townsend and Townsend and Crew LLP

[57] ABSTRACT

Optic switches manipulate an optical signal that has been expanded by a collimating lens. Switching is effected by introducing a prism between collimating lenses to redirect the optical signal to an alternative lens. The prism preferably has a cross-section defining a parallelogram, so that the optical signal is reflected twice within the prism to minimize cross-sectional distortion and avoid spectral effects. A circuit provides feedback on the actual position of the relay and prism for fault detection and diagnosis.

22 Claims, 7 Drawing Sheets

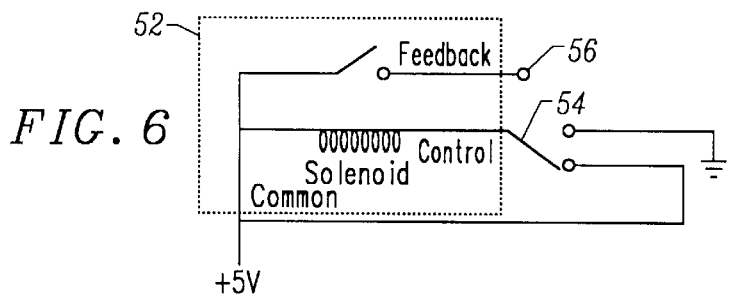

FIG. 6

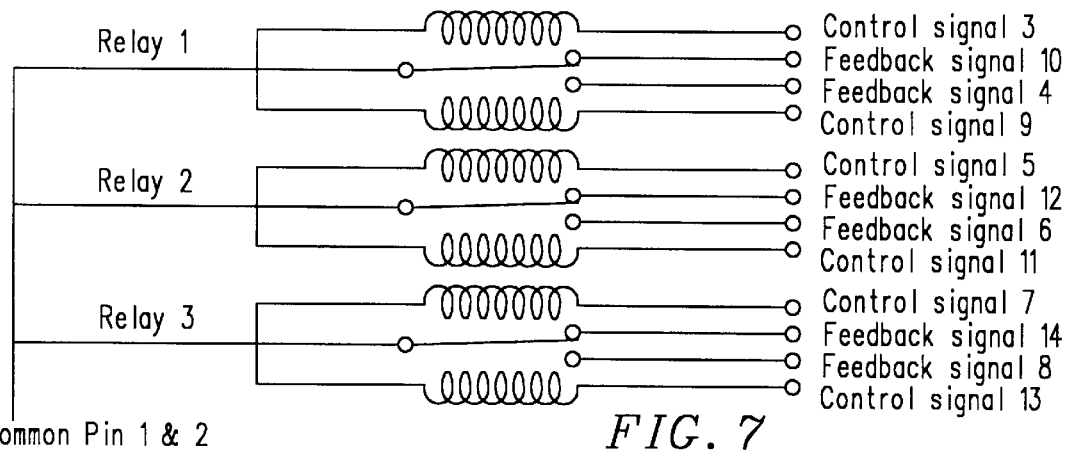

FIG. 7

| Optical Path | Relay 1 | | Relay 2 | | Relay 3 | |
|---|---|---|---|---|---|---|
| | Feedback Pin 4 | Feedback Pin 10 | Feedback Pin 6 | Feedback Pin 12 | Feedback Pin 8 | Feedback Pin 14 |
| C⇔1 | X | X | OPEN | SHORT | SHORT | OPEN |
| C⇔2 | OPEN | SHORT | OPEN | SHORT | OPEN | OPEN |
| C⇔3 | OPEN | SHORT | SHORT | OPEN | X | X |
| C⇔4 | SHORT | OPEN | SHORT | OPEN | X | X |

X = Don't Care

FIG. 8

| Optical Path | Relay 1 | | Relay 2 | | Relay 3 | |
|---|---|---|---|---|---|---|
| | Control Pin 9 | Control Pin 3 | Control Pin 11 | Control Pin 5 | Control Pin 13 | Control Pin 7 |
| C⇔1 | X | X | 0V | 5/12/24 V Pulse | 5/12/24 V Pulse | 0V |
| C⇔2 | 0V | 5/12/24 V Pulse | 0V | 5/12/24 V Pulse | 0V | 5/12/24 V Pulse |
| C⇔3 | 0V | 5/12/24 V Pulse | 5/12/24 V Pulse | 0V | X | X |
| C⇔4 | 5/12/24 V Pulse | 0V | 5/12/24 V Pulse | 0V | X | X |

X = Don't Care

FIG. 9

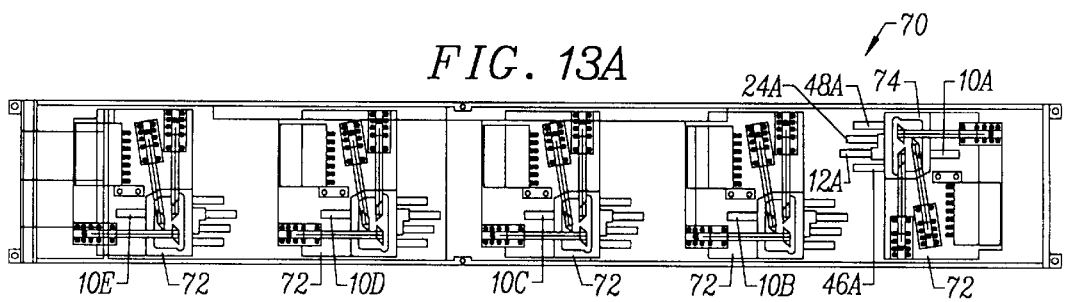
FIG. 13A
FIG. 13B
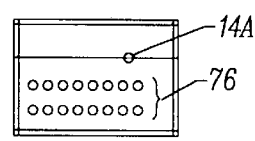
FIG. 13C
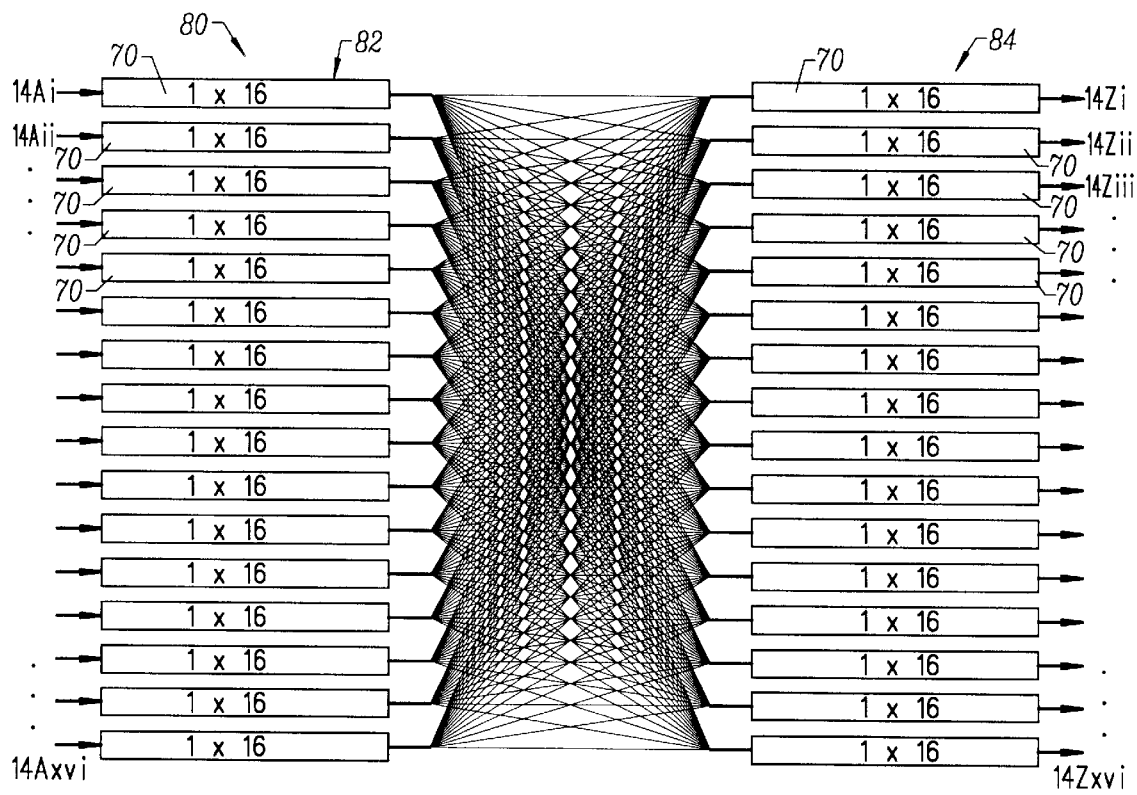
FIG. 14

HIGH-RELIABILITY MXN FIBER OPTIC SWITCHES

CROSS REFERENCE TO RELATED APPLICATIONS

This application is a continuation-in-part of, and claims priority from, U.S. Provisional Patent Application No. 60/047,025, filed May 19, 1997, the full disclosure of which is incorporated herein by referenced in its entirety.

BACKGROUND OF THE INVENTION

The present invention is generally related to fiber optic networks, and in particular, provides switches for directing optical signals along selected fibers of an optical network.

In fiber optic networks, light signals are transmitted along optical fibers to transfer information from one location to another. Although the propagation of light signals along optical fibers is analogous to the transmission of electronic data along metal wires, transferring the light signals from an input optical fiber to any of a plurality of output optical fibers is somewhat more problematic than the electrical coupling of wires in an electrical switch.

Electrical signals which are sent along a wire naturally propagate between input and output wires when they are electrically coupled together. In contrast, a light signal must be accurately entered into an optical fiber, or much of the signal strength will be lost. Modern optical fibers are very small in cross-section, and typically have a fairly narrow acceptance angle within which light entering the fiber should fall to promote efficient propagation of the light signal along the fiber. Therefore, optical switches generally rely on precise and selectable alignment between one or more input optical fibers and one or more output optical fibers. The alignment requirements of modern single mode optic fibers are particularly stringent, as their core diameters are typically as small as 2.0 to 10.0 $\mu$m.

In known electromechanical optical switches, the switching operation is often effected by precise movement of the ends of the input fibers relative to the ends of the output fibers, or by accurately moving a mirror to redirect the optical signals to a selected output fiber without moving the optical fibers themselves. Unfortunately, these accuracy and precision requirements substantially increase the cost and decrease the reliability of known optical switches.

Alternative known optical switch structures split the signal and selectively block the undesired optical pathways. Such switches are highly inefficient, requiring repeated signal amplification. Repeated amplification is costly, and also increases the potential for noise and distortion of the original optical signal. These disadvantages are compounded in complex optical switches which provide multiple alternative pathways with simultaneous switching, such as in 2×2 switches, N×N switches, N×M switches, and the like.

A particular challenge with electromechanical fiber optic switches is that they operate as an interface between two data transmission mediums. While the goal of these structures is to provide switching between optical fibers, they will often be actuated by electro-servos. Hence, when switching failures occur, it may be difficult to determine whether the failure lies in an optical component of the network, an optical component of the switch, an electrical component of the switching control circuitry, or an electromechanical component of the switch itself.

In light of the above, it would be advantageous to provide improved fiber optic switches for use in fiber optic networks. It would be particularly advantageous to provide highly reliable switch structures which provided a long lifetime, but which were more easily manufactured than known switch structures. It would be further desirable to provide such improved switches in a variety of configurations, including 1×2, 2×2, N×N, and M×N, with good switching performance, and at an affordable cost.

SUMMARY OF THE INVENTION

The present invention provides improved optic switches which manipulate an optical signal that has been radially expanded by a GRIN or other collimating lens. Switching is effected by introducing a prism between aligned GRIN lenses to redirect the optical signal to an alternative GRIN lens. The prism preferably has a cross-section defining a parallelogram, so that the optical signal is reflected twice within the prism. The optical signal can enter and leave such a prism along parallel paths. This arrangement minimizes cross-sectional distortion and avoids spectral effects, while providing a simple and easily manufactured switch structure. Surprisingly, reliability is enhanced by using separate prisms to direct the optical signal to each output fiber. As prisms which are not in use are removed entirely from the optical pathways of the switch, each prism need only be accurately aligned at a single position. Hence, the use of independent, dedicated relays to actuate each prism enhances the total system reliability over multiposition switching mechanisms. A simple circuit provides feedback on the actual position of the relay and prism for fault detection and diagnosis.

In a first aspect, the present invention provides an optical switch comprising an input assembly and first and second output assemblies. The input assembly includes an optical fiber and a collimating lens in an optical path of an optical signal from the input fiber so as to radially expand that signal. The first output assembly includes a collimating lens disposed in the optical path of the optical signal from the input assembly, and a first output optical fiber which is disposed in the optical path from the collimating lens. A second output assembly similarly comprises a second output optical fiber and a collimating lens. A first prism is movable between a first position and a second position. The first prism in the first position is disposed in the optical path of the expanded signal between the input assembly and the. first output assembly. The prism directs the signal through the collimating lens of the second output assembly, and into the second output fiber. The first prism in the second position is disposed out of the optical path from the input assembly.

In another aspect, the present invention provides an optical switch comprising a first input assembly and first and second output assemblies. The first input assembly comprises a first input optical fiber coaxial with a GRIN lens to transmit a first expanded optical signal. The first output assembly includes a first output optical fiber, and a GRIN lens which is aligned with the GRIN lens of the first input assembly. The second output assembly comprises a second output optical fiber and a GRIN lens. A first relay moves first redirecting element between a first position and a second position in response to a control signal. The first redirecting element in the first position is disposed between the GRIN lens of the first input assembly and the GRIN lens of the first output assembly to redirect the expanded first signal toward the GRIN lens of the second output assembly. In the second position, the first redirecting element is clear of the first signal. A first position indicating circuit is coupled to the first relay, and provides a signal in response to the position of the first prism. A particularly preferred redirecting element comprises a parallelogram prism which moves the signal laterally to a parallels optical path by twice reflecting the signal, ideally by total internal reflection.

A family of switches are also provided which make use of this general structure. Often times, the first signal may be alternatively directed towards a third output assembly using a second, independent prism. Switching is again effected by selectively introducing the second prism between the GRIN lenses of the first input assembly and the first output assembly. Where four or more outputs are desired, additional prisms may be introduced between one of the preceding prisms and its associated output assembly to redirect the optical signal transmitted from the prism. This arrangement prevents interference between the moving prisms, and allows the switches to be assembled along a simple planar optical cavity.

In yet another aspect, the present invention provides electromechanical optical switches comprising a switch housing unit which accepts a main input optical fiber. A plurality of subswitches are disposed within the switch housing unit, and each subswitch includes an input assembly, a first output assembly, a second output assembly, a first prism, a first relay, and a first position indicating circuit. Each of the input and output includes an input optical fiber coaxial with a GRIN lens. The GRIN lens of the input assembly transmits an expanded optical signal, while the GRIN lens of the first output assembly is aligned with the GRIN lens of the input assembly. The first prism has a cross-section which defines a parallelogram to redirect optical signals without distortion. The first relay moves the first prism between a first position and a second position in response to a control signal. When in the first position, the first prism is disposed between the GRIN lenses of the input assembly and the first output assembly to redirect the expanded signal toward the GRIN lens of the second output assembly. When in the second position, the first prism is clear of the signal. The first position indicating circuit is coupled to the first relay, and provides a signal in response to the position of the first prism. One of the subswitches comprises a first subswitch. The input fiber of the first subswitch defines the main input fiber, and at least one of the output fibers of the first subswitch is optically coupled to the input fiber of another subswitch.

BRIEF DESCRIPTION OF THE DRAWINGS

FIG. 6 is a diagram of position indicating and control signal circuitry for the switch of FIG. 2.

FIG. 7 is a diagram of a control signal and prism position indicating circuit for the switch of FIG. 5, in which latching relays maintain the prism positions until control signals are received.

FIGS. 8 and 9 are representative diagrams of the feedback provided by the position indicating circuit and the control inputs to the relays for use with the circuit of FIG. 7.

FIGS. 13A–C are a top view, a side view, and an end view of a 1×16 switch comprise a first subswitch and four other subswitches which receive signals from the first subswitch, each of the subswitches comprising a 1×4 structure as shown in FIGS. 4A–D.

FIG. 14 schematically illustrates a 16×16 optical switch which includes thirty-two of the switching units of FIGS. 13A–C, in which sixteen of the switching units are used as input switches, and in which sixteen of the switching units are used as output combiners.

DETAILED DESCRIPTION OF THE SPECIFIC EMBODIMENTS

The switches and switch systems of the present invention will find application for selectively coupling optical fibers in a wide variety of fiber optic networks, particularly in fiber optic telecommunications and data communication systems and networks. The switches of the present invention will further find uses within automatic optical testing systems, optical signal routing, optical sensor arrays, microwave phased-array antennas, and the like.

The present family of switches are generally adapted to provide high reliability and good switching performance at an affordable cost. The performance criteria and goals for the present switches include minimization of insertion loss, preferably to less than 1 dB over a typical temperature range of between −10° C. and 60° C., low polarization dependent loss and polarization mode dispersion, minimization of back reflection into the input fiber (preferably providing a return loss of at least 50 dB), a broad operational spectral range (preferably for signals for having a wavelength of between at least 1260 and 1650 nm, and cross-talk will generally be limited to less than −60 dB throughout the temperature range). Ideally, these capabilities will be provided with a high switching speed, switching time generally being less than 15 mSec, and ideally being less than about 10 mSec. The switches of the present invention will generally provide these capabilities for a life of at least ten million switching cycles, with high reliability and excellent repeatability. Moreover, the switches are compact in size and can be mass produced at an affordable cost as compared with known switching structures.

Figure 1A:
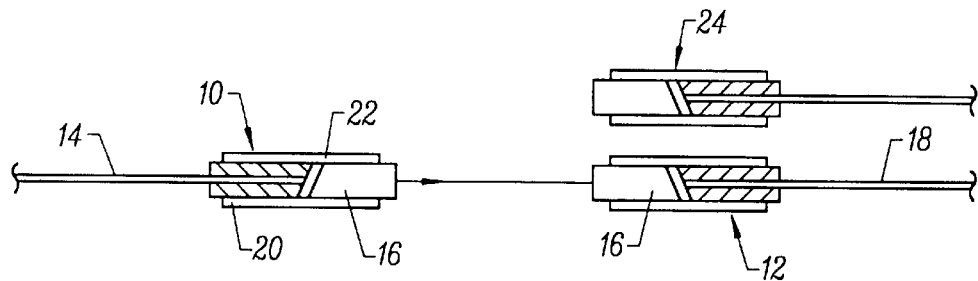
FIGS. 1A and B schematically illustrate the structure and operation of a 1×2 optical switch in which switching is effected by introducing a parallelogram prism into an expanded optical signal, according to the principles of the present invention.

Referring now to FIGS. 1A and B, the structure and operation of a 1×2 switch is representative of more complex switching arrangements. As illustrated in FIG. 1A, a first input assembly 10 is aligned with a first output assembly 12. More specifically, the first input assembly includes a first input fiber 14 and a GRIN lens 16. Optical signals from the first input fiber 14 are collimated and radially expanded using a quarter pitch GRIN lens. A similar GRIN lens of the first output assembly focuses the optical signal for entry into a first output fiber 18.

Quarter pitch (or near quarter pitch) GRIN lenses arranged at the ends of input and output optical fibers have been found to be very effective as collimators. It has been found that using a GRIN lens having a length of approximately 0.23 times the pitch is more effective than a GRIN lens of a length of 0.25 times the pitch. While a variety of alternative collimating lenses may be used within the scope of the present invention, including aspheric lenses, GRIN lenses are generally preferred.

Input fiber 14 is held in a cylindrical glass ferrule 20. The end of the ferrule and the end of the fiber adjacent the GRIN lens are slant polished together so that the tip of the fiber does not end with a surface perpendicular to the longitudinal axis of the fiber. Typically, these ends form an angle of between about 8° C. and 12° C. These end surfaces are then covered with an anti-reflective coating.

The face of GRIN lens 16 adjacent ferrule 20 is reciprocally slant-polished at substantially the same angle as the ferrule and fiber. This slant-polished face is also coated with antireflection material to reduce insertion loss, and to minimize reflections between these surfaces.

Ferrule 20 (and the associated fiber) is separated from GRIN lens 16 by a gap to avoid fabry-perot interference, the gap typically being at least about 0.05 mm. The end of GRIN lens 16 opposite optical fiber 14 will also have a coating of antireflection material which is effective throughout the spectral bandwidth of the intended optical signals. It should be recognized that each of the input and output assemblies will generally comprise a similar structure for the efficient transmission or reception of optical signals.

Figure 1B:
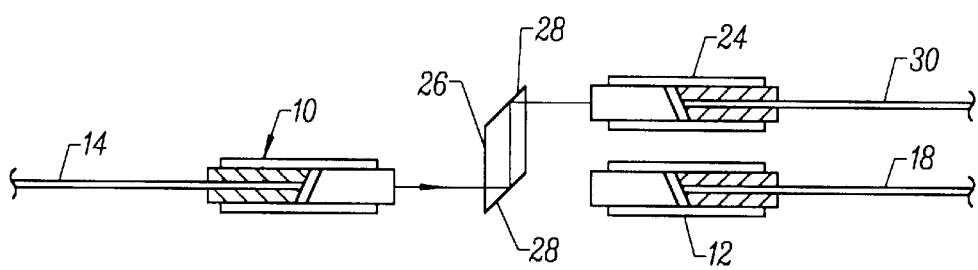

As can be understood with reference to FIG. 1B, the optical signal from first input assembly 10 can be redirected to a second output assembly 24 by a prism 26. Prism 26 has a cross-section which defines a parallelogram, so that light which is refracted into the prism from first input assembly 10 is reflected twice within the prism prior to being refracted out toward second output assembly 24. In some embodiments, the optical signal will be at a sufficient angle relative to reflection surfaces 28 of prism 26 to provide total internal reflection of the optical signal. This provides a highly efficient redirecting mechanism which does not rely on reflective coatings or the like. Alternatively, highly reflective coatings may be used. Regardless, the signal refracted from prism 26 will generally be parallel to the input signal from first input assembly 10. This greatly facilitates the assembly and alignment of second output assembly 24 so that the optical signal is efficiently introduced into a second output fiber 30.

Figure 2:
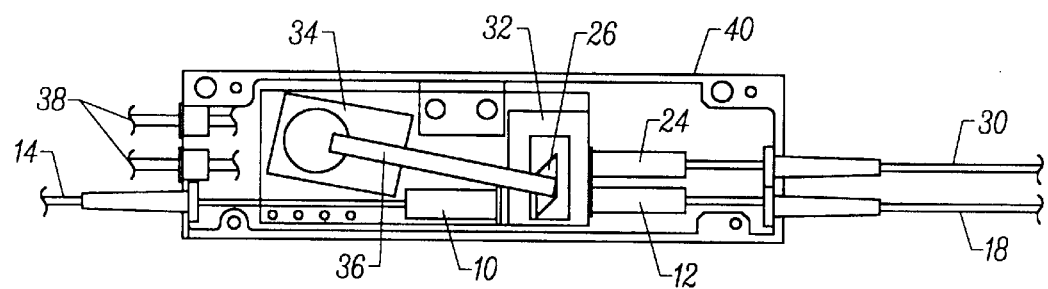
FIG. 2 is a top view of an embodiment of the switch of FIG. 1A and B.

A top view of an exemplary 1×2 fiber optic switch is shown in FIG. 2. First input assembly 10, first output assembly 12, and second output assembly 24 are affixed to a ring wall 32 to maintain the desired alignment. The ring wall defines a cavity having an axis normal to the plane of the illustration, and a relay 34 moves prism 26 into and out of the optical path of the optical signal from the first input assembly substantially along that axis. In other words, the prism moves roughly normal to the plane of the illustration of FIG. 2. More specifically, an arm 36 of relay 34 is hingedly mounted to a body of the relay, while prism 26 is support in cantilever at the end of the arm. Arm 36 is actuated by relay 34 in response to electrical control signals supplied through electrical wires 38, and a feedback control system (described below) verifies the position of the arm to ensure that the optical switch is operating properly. The relay and input and output assemblies are contained within a housing 40 to prevent environmental degradation of the actuation and optical elements of the switch.

Figure 3A:
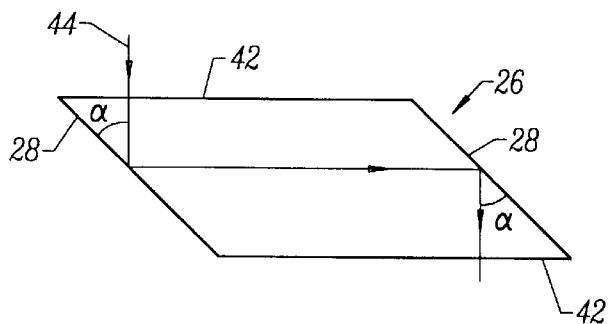
FIGS. 3A and B are top and side views, respectively, of the prism of the switch of FIGS. 1A and B.
Figure 3B:
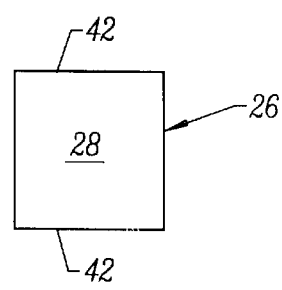

Referring now to FIGS. 3A and B, prism 26 will typically comprise a glass or fused quartz, and will optionally have a highly reflective coating on reflection surfaces 28. Such highly reflective coatings are typically formed from multi-layer dielectric coatings and/or metallic coatings, as is generally known in the art. Refraction surfaces 42 may include anti-reflective coatings of alternative multilayer dielectric coating materials. Even without reflective coatings, total internal reflection will generally result when optical signal 44 is incident upon reflection surface 28 with an angle $\alpha$ which is less than the critical angle. Such total internal reflection within a prism provides a highly efficient redirecting mechanism which minimizes the loss of signal strength. To avoid the spectral separation often associated with three-sided prisms, prism 26 will preferably be formed with a parallelogram cross-section, so that light signals are reflected twice within the prism. Spectral separation is avoided by again reflecting the signal each time at an angle $\alpha$ and by refracting the signals into and out of parallel faces of the prism at substantially the same angle (preferably at about 90° to minimize losses). These compensating total internal reflections and refracting avoid polarization mode dispersion and polarization dependent loss. The parallelogram cross-section of prism 26 also helps ensure that the entry and exit paths into and out of the prism are parallel even if the optical path enters the prism at an angle.

Figure 4B:
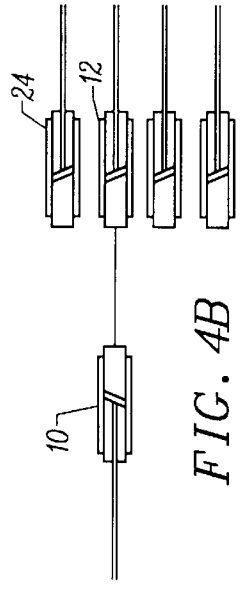
FIGS. 4A–D schematically illustrate the structure and operation of a 1×4 switch according to the principles of the present invention.
Figure 4A:
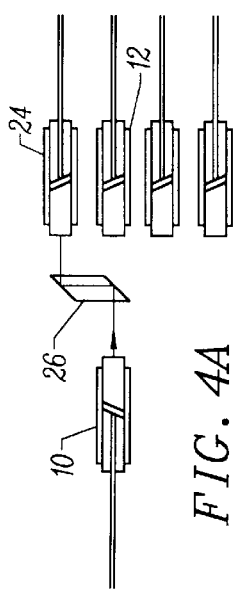
Figure 4D:
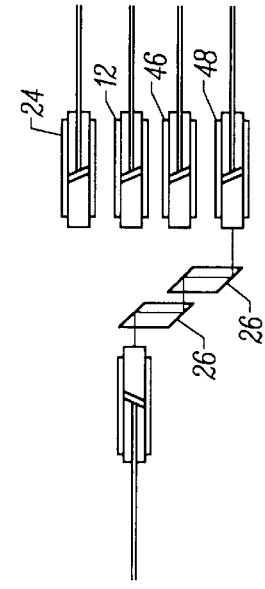
Figure 4C:
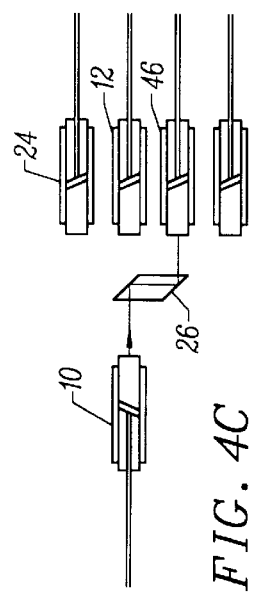

The operation of a 1×4 switch having three independently movable prisms can be understood with reference to FIGS. 4A–D. Switching between first output assembly 12 and second output assembly 24 is effected by introduction or removal of a prism, as described above. Similarly, an alternative prism may be introduced between the first input assembly 10 and the first output assembly 12, but with a different orientation so as to direct the optical signal to a third output assembly 46, as shown in FIG. 4C. Switching to a fourth output assembly 48 is effected by yet another prism 26, here disposed between one of the prior redirecting prisms and its associated output assembly (here third output assembly 46). Clearly, where 1×3 switching is desired, this final output assembly and prism may be omitted.

Figure 5:
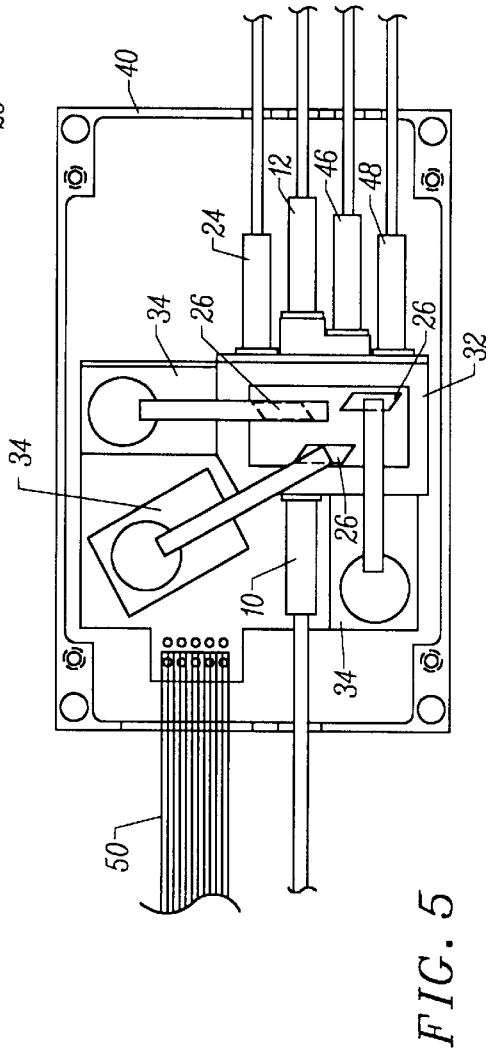
FIG. 5 is a top view of an embodiment of the switch of FIGS. 4A–D.

A 1×4 switch is shown in more detail in FIG. 5. Each of the three prisms 26 is independently supported by an associated relay 34. While a wide variety of prism actuation mechanisms might be used, a particularly advantageous miniature electrical relay is available from Fujitsu of Tokyo, Japan, as Model No. 211A.

In general, reliability is enhanced (and costs are minimized) through the use of a limited number of different moving parts, where each moving part has a very simple and reliable independent operation. Hence, relays 34 independently introduce and/or remove an associated prism 26 from the optical path. While a wide variety of alternative arrangements might be used, the substantially planar staggered alignment of prisms 26 within ring wall 32 facilitates assembly of the switch, and helps to avoid interference between the separate relays. The use of small, light prisms also minimizes movement time for each relay, enhancing overall optical switching speeds. Once again, each reflection within the prisms is preferably a total internal reflection to avoid loss. Loss is also minimized by limiting the total distance the optical signals travel between the GRIN lens of input assembly 10 and the GRIN lens of each of the output assemblies. The parallel arrangement of the input and output assemblies also facilitates assembly of the switch, and helps minimize the size of housing 40. Control and feedback from relays 34 is provided through cable 50, which is ideally coupled to a standard twenty pin connector.

A feedback and control circuit for a simple 1×2 switch 52 (similar to the switch of FIG. 2) is shown in FIG. 6. In this embodiment, the relay is non-latching, and the prism will return to a predetermined nominal position if no control signal is provided. Switching is effected by actuating electrical switch 54 to power the solenoid. Once the arm of the relay moves from its nominal position to an energized position, the arm completes an electrical circuit so that a feedback signal can be sensed at feedback pin 56. Advantageously, this feedback is not provided based on the control signal input, but on the actual position of the relay arm. The feedback signal may be used to energize a light emitting diode, or may be sensed by a control processor.

A more complex control and feedback circuit for a 1×4 switch with latching relays is illustrated in FIG. 7. Such relays will remain in their initial position until a particular control signal is received. Feedback signals are sent to either of two alternative pins to indicate the position of the prism (within the optical path or clear of the optical path), and opposed solenoids within each relay are used to move the relay arm from its initial position to the alternative position.

FIGS. 8 and 9 provide representative feedback indicators and control signal inputs for representative pin numbers of a twenty-pin connector. Depending on the particular model of relay used, control inputs may be 5 volts, 12 volts, or 24 volts. As can be understood with reference to FIG. 5, in certain configurations the position of a particular relay will have no effect on the optical path through the switch. For example, if both the other prisms 26 are clear of the optical path from first input assembly 10, that optical signal will continue straight through the switch to first output assembly 12, regardless of the position of the prism associated with the fourth output assembly 48. These configurations are designated by an "X" on the charts of FIGS. 8 and 9.

Figure 10:
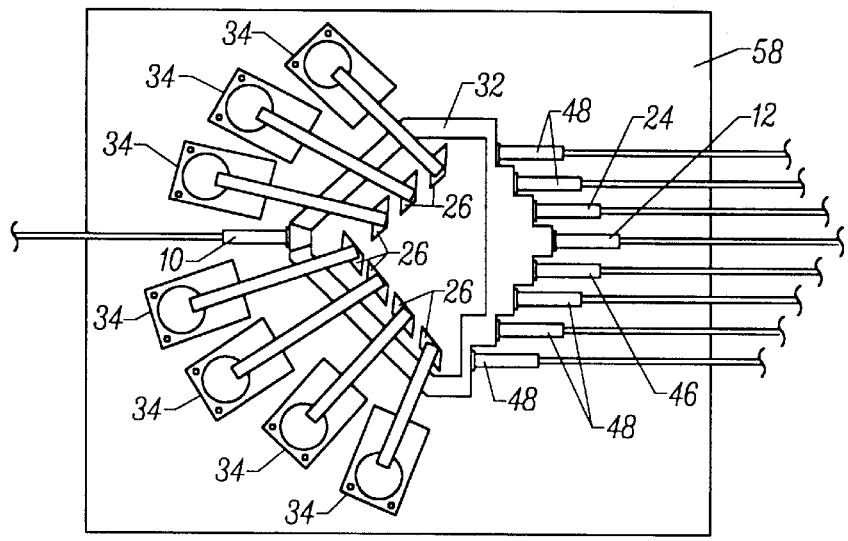
FIG. 10 is a top view of a 1×8 switch having seven independently movable prisms, according to the principles of the present invention.

As can be understood with reference to FIG. 10, more complex switch arrangements can also be provided within the scope of the present invention. For example, a 1×8 switch 58 includes four other output assemblies 48, each of which are aligned with an associated prism 26. The prisms associated with the other output assemblies 48 will intercept the optical signal from the first input assembly after that signal has already traveled through a prior prism. As used herein, a "prior prism" for a particular prism means a prism through which the optical signal travels before entering that particular prism.

Figure 11A:
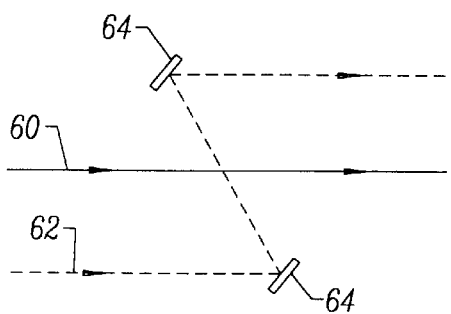
FIGS. 11A and B schematically illustrate the operation of a 2×2 switch, according to the principles of the present invention.
Figure 11B:
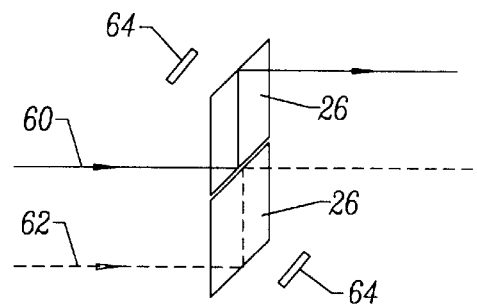

The present invention also encompasses switch arrangements having multiple input signals which can be simultaneously directed to selected output fibers. As shown in FIG. 11A, first and second optical signals 60, 62 are transmitted between aligned input and output optical fiber assemblies, these input and output assemblies generally having the structure described regarding FIG. 1A. Fixed mirrors 64 are arranged so that second signal 62 crosses the first signal 60, and so that the signals can enter and leave the switching cavity along parallel optical paths. By introducing a pair of prisms 26 between the input and output assemblies, the first and second signals are redirected to the alternative output assemblies to effect simultaneous 2×2 switching. Final alignment of the input and output assemblies is facilitated by the use of adjustable mountings for fixed mirrors 64.

Figure 12:
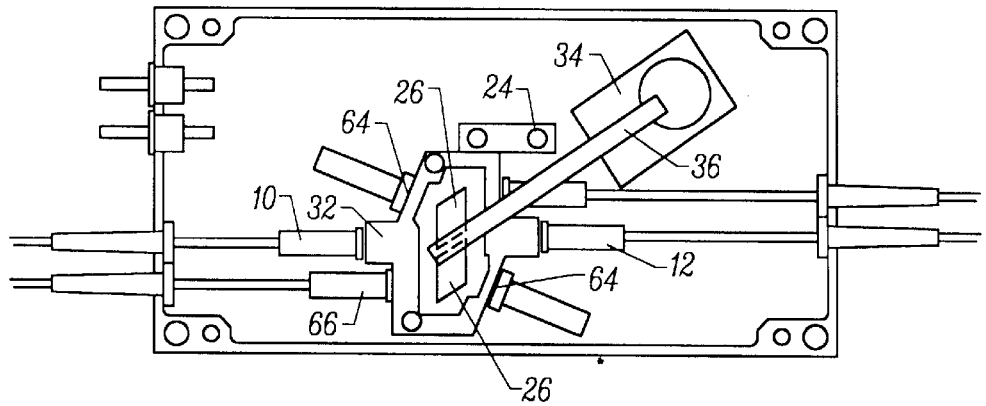
FIG. 12 is a top view of an embodiment of the switch of FIGS. 11A and B.

A switch structure which provides such 2×2 switching is shown in more detail in FIG. 12. Supporting both prisms 26 on a single arm 32 of relay 34 effects substantially simultaneous switching of the two optical signals. Alignment between first input assembly 10, first and second output assemblies 12,24, and a second input assembly 26 is facilitated by the adjustable mounting for fixed mirrors 64.

The high reliability and switch position feedback provided by the present invention are particularly advantageous for use in complex switching arrangements, such as that illustrated in FIGS. 13A–C. A 1×16 switch 70 is formed from five independently actuatable subswitches 72. The structure and operation of each subswitch is substantially the same as that shown and described with reference to FIGS. 4A–D and 5, and, one of these subswitches comprises a first subswitch 74. An input fiber 10A of first subswitch 74 defines a switch input fiber for switch 70, and each of the output fibers 12A, 24A, 46A, and 48A of first subswitch 74 is optically coupled to an associated input fiber 10B, 10C, 10D, or 10E of another subswitch. In other words, an optical fiber extends from first output assembly 12A of first subswitch 74 to first input assembly 10B of one of the other subswitches. Hence, after the first subswitch directs the optical signal to one four other output fibers, the optical signal is then transmitted to another subswitch which can direct the optical signal along any of four output optical fibers. Switch 70 is thus capable of directing an optical signal which is input through a switch input fiber 14A to any of sixteen output optical fibers 76.

The input and output control signals may be transmitted to and from switch 70 along a single cable, or separate electrical connectors may be provided for each subswitch 72. FIG. 13B also provides a side view which shows the motion of arm 36 of relay 34 and prism 26.

A still more complex 16×16 switching arrangement is illustrated in FIG. 14. 16×16 switch 80 comprises thirty-two switches 70. Half of the 1×16 switches 70 are used as input switching units 82, while the other half are used as output switching units or combiners 84. An optical signal is introduced to a particular input switching unit 82 through input fiber 14A*i*, 14A*ii*, 14A*iii* . . . , or 14A*xvi*, and the associated switch 70 directs that optical signal to a particular combiner 84. Each combiner efficiently couples the input from a particular switching unit 82 to its main output fiber 14Z*i*, 14Z*ii*, 14Z*iii*, . . . or 14Z*xvi*. This switching arrangement illustrates that the switches of the present invention are also useable as selectable combiners for entering signals from selected input optical fibers to a particular output optical fiber.

Figure 15:
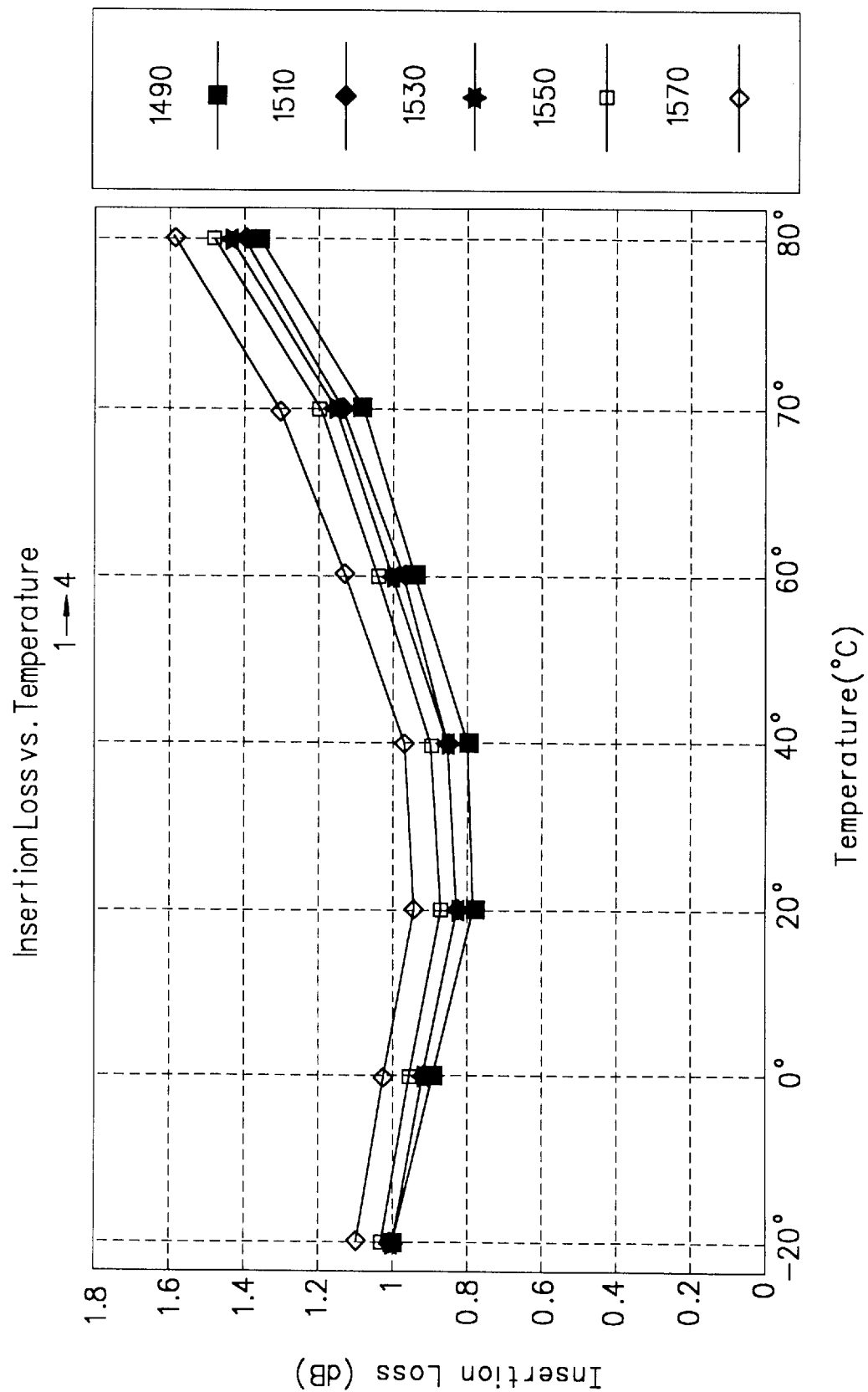
FIG. 15 is a graph of the insertion loss versus temperature for the 1×4 switch of FIG. 5.
Figure 16:
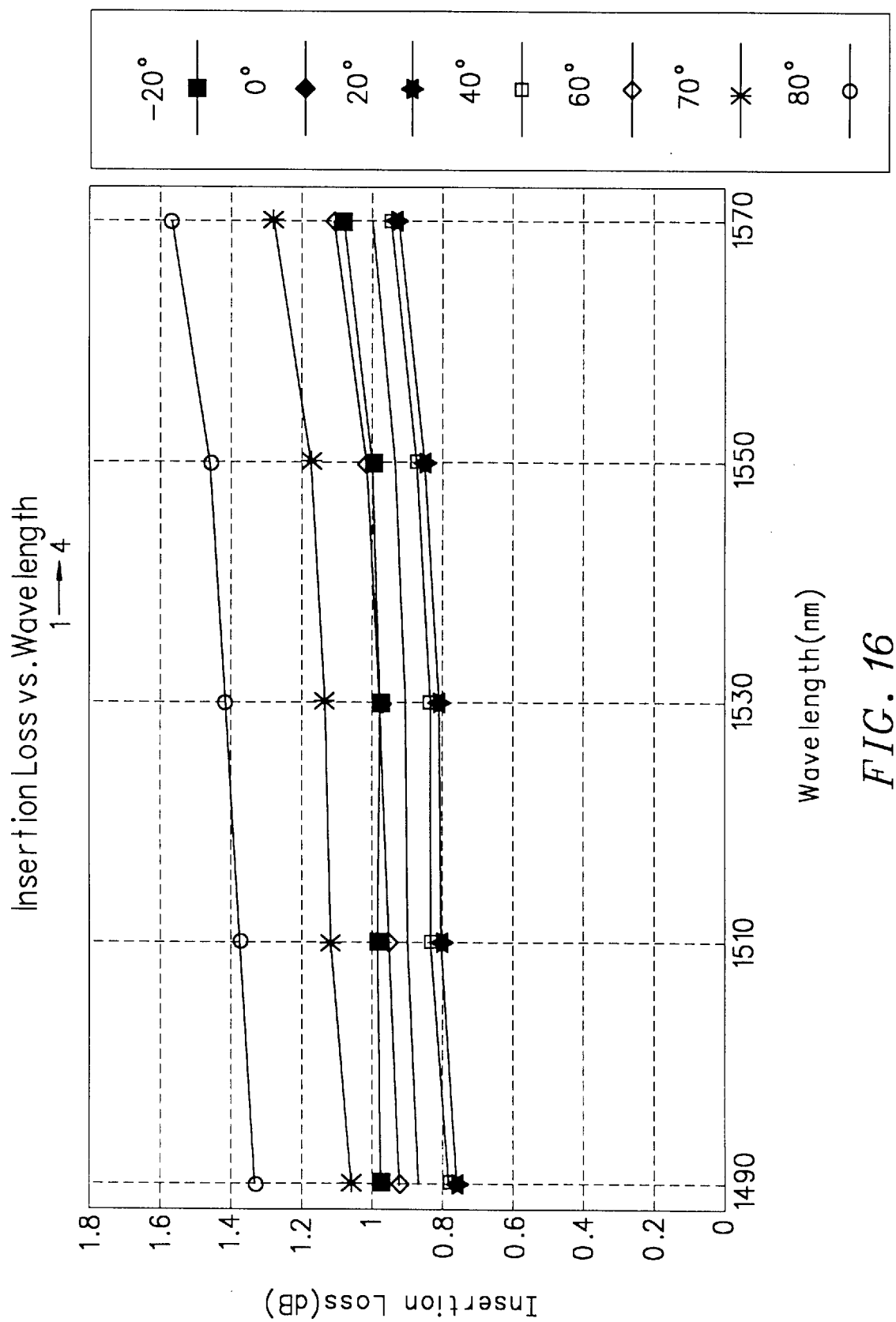
FIG. 16 is a graph of insertion loss versus wavelength for the 1×4 switch of FIG. 5.

The insertion loss of the 1×4 switch illustrated in FIG. 5 are illustrated in FIGS. 15 and 16, across a range of temperature and wavelengths, respectively. Throughout the temperature range of −20° C. to 80° C., and throughout a wavelength range of 1490 to 1570 nm, insertion losses remain below about 1.6 dB. The insertion losses as illustrated in FIGS. 15 and 16 represent the loss between the input fiber and the third output fiber, which is the highest loss path through that optical switch.

Even when the 1×4 switches of the present invention are combined in more complex switching arrangements such as 16×16 switch 80 illustrated in FIG. 14, optical switching times will typically be below 20 mSec, with total insertion losses of less than 3.6 dB, and a cross-talk of under −45 dB. Polarization dependent loss in that complex switching arrangement will still generally be less than 0.1 dB, and return loss (a measure of the input over the reflected output) will be 40 dB or more. Polarization mode dispersion throughout the 16×16 switching array will be less than 0.25 psec, and the switch will handle up to 250 mw of optical power.

While the exemplary embodiments have been described in some detail, for clarity of understanding and by way of illustration, a wider variety of changes, modifications, and alternatives will be obvious to those with skill in the art. Therefore, the present invention is limited solely by the appended claims.

What is claimed is:

1. An optical switch comprising:
   an input assembly comprising an input optical fiber and a collimating lens in an optical path of an optical signal from the input fiber to radially expand the signal;
   a first output assembly comprising a collimating lens and a first output optical fiber, the collimating lens disposed in the optical path of the optical signal from the input assembly, the first output fiber disposed in the optical path from the collimating lens;
   a second output assembly comprising a second output optical fiber and a collimating lens; and
   a first prism movable between a first position and a second position, the first prism in the first position disposed in the optical path of the expanded signal between the input assembly and the first output assembly so as to redirect the signal through the collimating lens of the second output assembly and into the second output fiber, the first prism in the second position disposed out of the optical path from the input assembly.

2. A switch as claimed in claim 1, further comprising a relay supporting the first prism to move the prism between the first position and the second position in response to a control signal.

3. A switch as claimed in claim 2, wherein the first prism is cantilevered at an end of an arm of the relay.

4. A switch as claimed in claim 3, wherein the input assembly and the first and second output assemblies are affixed about a ring wall defining a cavity having an axis, wherein the optical paths cross the cavity laterally relative to the axis, and wherein the relay selectably moves the first prism substantially axially between the first position and the second position.

5. A switch as claimed in claim 2, wherein the signal from the position circuit does not vary in response to the control signal unless the position of the first prism changes.

6. A switch as claimed in claim 2, wherein the relay is biased to the first position or the second position when the control signal is absent.

7. A switch as claimed in claim 2, wherein the relay is biased to maintain the position of the first prism when the control signal is absent.

8. A switch as claimed in claim 2, further comprising a position indicating circuit coupled to the relay, the position circuit providing a signal in response to a position of the first prism.

9. A switch as claimed in claim 1, further comprising:
   a third output assembly having a collimating lens and a third output optical fiber; and
   a second prism movable between a first position and a second position, the second prism in the first position disposed in the optical path of the optical signal from the input assembly so as to redirect the optical signal through the collimating lens of the third output assembly and into the third output fiber, the second prism in the second position disposed out of the optical path from the input assembly.

10. A switch as claimed in claim 9, further comprising:
    a fourth output assembly having a collimating lens and a fourth output optical fiber; and
    a third prism movable between a first position and a second position, the third prism in the first position disposed in the optical path of the optical signal between the first prism and the second output assembly so as to redirect the optical signal from the first prism through the collimating lens of the fourth output assembly and into the fourth output fiber, the third prism in the second position disposed out of the optical path between the first prism and the second output assembly when the first prism is in the first position.

11. A switch as claimed in claim 1, wherein a cross-section of the first prism defines a parallelogram, the first prism arranged so that the optical signal is reflected twice by total internal reflection within the first prism when the first prism is disposed in the first position, the GRIN lens of the first output assembly being parallel to the GRIN lens of the second output assembly.

12. An optical switch comprising:
    a first input assembly comprising a first input optical fiber coaxial with a GRIN lens to transmit a first expanded optical signal;
    a first output assembly comprising a first output optical fiber coaxial with a GRIN lens, the GRIN lens aligned with the GRIN lens of the first input assembly;
    a second output assembly comprising a second output optical fiber coaxial with a GRIN lens;
    a first redirecting element;
    a first relay which moves the first redirecting element between a first position and a second position in response to a control signal, the first redirecting element in the first position disposed between the GRIN lens of the first input assembly and the GRIN lens of the first output assembly to redirect the expanded first signal toward the GRIN lens of the second output assembly, the first redirecting element in the second position clear of the first signal; and
    a first position indicating circuit coupled to the first relay, the position circuit providing a signal in response to the position of the first redirecting element.

13. A switch as claimed in claim 12, wherein the first redirecting element comprises a prism having a cross-section which defines a parallelogram, and in which the first signal is reflected twice.

14. A switch as claimed in claim 13, further comprising:
    a second input assembly comprising a second input fiber coaxial with a GRIN lens to transmit a second expanded optical signal, the GRIN lens aligned with the GRIN lens of the second output fiber; and
    a second prism movable between a first position and a second position by the first relay, the second prism in the first position disposed between the GRIN lens of the second input assembly and the GRIN lens of the second output assembly to redirect the second expanded signal toward the GRIN lens of the first output assembly, the second prism in the second position clear of the second signal.

15. A switch as claimed in claim 13, further comprising:
    a third output assembly comprising a third output optical fiber coaxial with a GRIN lens;
    a second prism which is movable between a first position and a second position, the second prism in the first position disposed between the GRIN lens of the first input assembly and the GRIN lens of the first output assembly to redirect the expanded first signal toward the GRIN lens of the third output assembly, the second prism in the second position clear of the first signal.

16. A switch as claimed in claim 15, further comprising:
a forth output assembly comprising a forth output optical fiber coaxial with a GRIN lens;
a third prism which is movable between a first position and a second position, the third prism in the first position disposed between the first prism and the GRIN lens of the forth output assembly when the first prism is in the first position to redirect the expanded first signal toward the GRIN lens of the forth output assembly, the third prism in the second position clear of the first signal.

17. A switch as claimed in claim 16, further comprising:
a plurality of N other output assemblies, each of the other output assemblies comprising an associated output optical fiber coaxial with an associated GRIN lens;
a plurality of N other prisms, each other prism associated with one of the N other output assemblies, each other prism movable between a first position and a second position, each other prism in the first position disposed between a prism and the GRIN lens of the output assembly associated with said prism when said prism is in the first position, so as to redirect the expanded first signal toward the GRIN lens of the output assembly associated with the other prism, the other prism in the second position clear of the first signal.

18. A switch as claimed in one of claims 14, 15, and 17, wherein each prism has a cross-section which defines a parallelogram, and wherein each output assembly is parallel to the first output assembly.

19. A switch as claimed in one of claims 16 and 17, wherein each prism is supported by an associated relay which moves the prism in response to an associated control signal, and further comprising a position indicating circuit coupled to each relay, the position circuit providing a signal in response to the position of the first prism regardless of the associated control signal.

20. An electromechanical optical switch comprising:
a switch housing unit which accepts a main input optical fiber;
a plurality of subswitches disposed within the switch housing unit, each subswitch comprising:
an input assembly comprising an input optical fiber coaxial with a GRIN lens to transmit an expanded optical signal;
a first output assembly comprising a first output optical fiber coaxial with a GRIN lens, the GRIN lens aligned with the GRIN lens of the input assembly;
a second output assembly comprising a second output optical fiber coaxial with a GRIN lens;
a first prism having a cross-section which defines a parallelogram to redirect optical signals without distortion;
a first relay which moves the first prism between a first position and a second position in response to a control signal, the first prism in the first position disposed between the GRIN lens of the input assembly and the GRIN lens of the first output assembly to redirect the expanded signal toward the GRIN lens of the second output assembly, the first prism in the second position clear of the signal; and
a first position indicating circuit coupled to the first relay, the position circuit providing a signal in response to the position of the first prism;
wherein one of the subswitches comprises a first subswitch, the input fiber of the first subswitch defining the main input fiber, at least one of the output fibers of the first subswitch being optically coupled to the input fiber of another subswitch.

21. A switch as claimed in claim 20, wherein each subswitch further comprises:
a third output assembly comprising a third output optical fiber coaxial with a GRIN lens;
a second prism which is movable between a first position and a second position, the second prism in the first position disposed between the GRIN lens of the input assembly and the GRIN lens of the first output assembly to redirect the expanded signal toward the GRIN lens of the third output assembly, the second prism in the second position clear of the signal;
a forth output assembly comprising a forth output optical fiber coaxial with a GRIN lens; and
a third prism which is movable between a first position and a second position, the third prism in the first position disposed between the first prism and the GRIN lens of the forth output assembly when the first prism is in the first position to redirect the expanded signal toward the GRIN lens of the forth output assembly, the third prism in the second position clear of the signal;
wherein each of the output fibers of the first subswitch is optically coupled to the input fiber of an associated subswitch.

22. An electromechanical optical switch as claimed in claim 20, further comprising:
a plurality of switch housing units, each housing unit containing a plurality of subswitches; and
a plurality of combiner housing units, each combiner housing unit containing a plurality of subcombiners and accepting a main output optical fiber, each subcombiner comprising:
an output assembly comprising an output optical fiber coaxial with a GRIN lens;
a first input assembly comprising a first input optical fiber coaxial with a GRIN lens to expand a first optical signal, the GRIN lens aligned with the GRIN lens of the output assembly;
a second input assembly comprising a second input optical fiber coaxial with a GRIN lens to expand a second optical signal;
a first prism having a cross-section which defines a parallelogram to redirect optical signals without distortion;
a first relay which moves the first prism between a first position and a second position in response to a control signal, the first prism in the first position disposed between the GRIN lens of the second input assembly and the GRIN lens of the output assembly to redirect the second expanded signal toward the GRIN lens of the output assembly, the first prism in the second position clear of the first signal; and
a first position indicating circuit coupled to the first relay, the position circuit providing a signal in response to the position of the first prism;
wherein one of the subcombiners within each combiner housing unit comprises a last subcombiner, the output fiber of the last subcombiner being the main output fiber for the combiner housing unit, at least one of the input fibers of the last subcombiner being optically coupled to the output fibers of another subcombiner; and
wherein a plurality of the output fibers of the other subswitches are optically coupled to an associated input fiber of the other subcombiners.

* * * * *